(12) United States Patent
Wang et al.

(10) Patent No.: US 10,884,515 B2
(45) Date of Patent: Jan. 5, 2021

(54) LAMINATION METHOD OF SUBSTRATES AND PRODUCT PREPARED THEREBY

(71) Applicants: WACKER CHEMICALS (CHINA) COMPANY LIMITED, Shanghai (CN); WACKER CHEMIE AG, Munich (DE)

(72) Inventors: Jason Wang, Shanghai (CN); HyungDae Jin, Seoul (KR); JungEun Lee, Seoul (KR); SeungA Lee, Yongin-si (KR)

(73) Assignee: WACKER CHEMIE AG, Munich (DE)

( * ) Notice: Subject to any disclaimer, the term of this patent is extended or adjusted under 35 U.S.C. 154(b) by 157 days.

(21) Appl. No.: 15/771,610

(22) PCT Filed: Nov. 6, 2015

(86) PCT No.: PCT/CN2015/094038
§ 371 (c)(1),
(2) Date: Apr. 27, 2018

(87) PCT Pub. No.: WO2017/075823
PCT Pub. Date: May 11, 2017

(65) Prior Publication Data
US 2018/0314352 A1 Nov. 1, 2018

(51) Int. Cl.
*G06F 3/0354* (2013.01)
*C09J 5/00* (2006.01)
(Continued)

(52) U.S. Cl.
CPC .......... *G06F 3/03547* (2013.01); *B29C 66/45* (2013.01); *B29C 66/71* (2013.01);
(Continued)

(58) Field of Classification Search
CPC ........... C08L 83/04; C08L 83/06; C08L 83/08
See application file for complete search history.

(56) References Cited

U.S. PATENT DOCUMENTS 9,365,757 B2 * 6/2016 Mayumi ............ G02B 19/0009
2011/0092049 A1 4/2011 Chen et al.
(Continued)

FOREIGN PATENT DOCUMENTS

| CN | 102036805 A | 4/2011 |
|---|---|---|
| CN | 103814093 A | 5/2014 |

(Continued)

OTHER PUBLICATIONS

Stanford Materials—Nano Materials. Jul. 25, 2014. <http://www.stanfordmaterials.com/nano.html>. Wayback Machine Internet Archive. Accessed Dec. 20, 2019. <https://web.archive.org/web/20140725092749/http://www.stanfordmaterials.com/nano.html>) (Year: 2014).*

*Primary Examiner* — Carson Gross
(74) *Attorney, Agent, or Firm* — Brooks Kushman P.C.

(57) ABSTRACT

Substrates suitable for optoelectronic display devices are prepared by:
(a) applying a liquid silicone optical bonding agent to a first substrate,
(b) activating the liquid silicone optical bonding agent applied in step (a) by irradiation with light in a wavelength range of 200 nm to 500 nm, wherein the duration of the irradiation is less than the gel time of the liquid silicone optical bonding agent, and
(c) applying a second substrate to the activated liquid silicone optical bonding agent before the liquid silicone optical bonding agent is gelled.

14 Claims, 1 Drawing Sheet

(1-1)  (1-2)  (1-3)  (1-4)

(51) Int. Cl.

| | |
|---|---|
| *F16B 11/00* | (2006.01) |
| *C08L 83/04* | (2006.01) |
| *B29C 65/00* | (2006.01) |
| *C09J 183/04* | (2006.01) |
| *C08G 77/12* | (2006.01) |
| *C08G 77/20* | (2006.01) |
| *C08G 77/04* | (2006.01) |

(52) U.S. Cl.
CPC .................. *C08L 83/04* (2013.01); *C09J 5/00* (2013.01); *C09J 183/04* (2013.01); *F16B 11/006* (2013.01); *C08G 77/04* (2013.01); *C08G 77/12* (2013.01); *C08G 77/20* (2013.01); *C09J 2301/312* (2020.08); *C09J 2301/416* (2020.08); *C09J 2483/00* (2013.01)

(56) References Cited

U.S. PATENT DOCUMENTS

| | | | |
|---|---|---|---|
| 2011/0171400 A1* | 7/2011 | Thompson | C08G 77/08 |
| | | | 428/1.32 |
| 2014/0178599 A1 | 6/2014 | Wright et al. | |
| 2015/0075698 A1* | 3/2015 | Lu | C09J 5/06 |
| | | | 156/60 |
| 2015/0144839 A1 | 5/2015 | Bohmer et al. | |

FOREIGN PATENT DOCUMENTS

| | | |
|---|---|---|
| CN | 104768731 A | 7/2015 |
| JP | 2002371261 A | 12/2002 |
| WO | 2009/137220 A2 | 11/2009 |

\* cited by examiner (1-1)　　　(1-2)　　　(1-3)　　　(1-4)

(2-1)　　　(2-2)　　　(2-3)

(3-1)　　　(3-2)　　　(3-3)　　　(3-4)

LAMINATION METHOD OF SUBSTRATES AND PRODUCT PREPARED THEREBY

CROSS REFERENCE TO RELATED APPLICATIONS

This application is the U.S. National Phase of PCT Appln. No. PCT/CN2015/094038 filed Nov. 6, 2015, the disclosure of which is incorporated in its entirety by reference herein.

BACKGROUND OF THE INVENTION

1. Field of the Invention

The present disclosure relates to a lamination method of substrates, especially a lamination method for preparing composite structure of substrates for interactive displays.

2. Description of the Related Art

Optical bonding is more and more being applied in the field of electrical displays for filling the air gap between a touch screen panel and a display module (touch film or glass and overlay), to improve visibility, readability, and durability. Acrylate polymer is usually used as an optical bonding agent for consumer electronic displays, such as smartphones and tablets. There are two forms of Acrylates: optically clear adhesive (OCA, tape form) and optically clear resin (OCR, liquid form). Acrylate OCR is cured under UV irradiation. In recent years, optically clear silicone material, which can be cured by either heating or UV irradiation, was introduced into the lamination processes.

Nowadays, large size displays, such as Notebook PC and All-in-one PC, also require optical bonding in their manufacturing process, wherein acrylate adhesives do not meet the requirements. Acrylate OCR has a yellowing issue at the edges of visible areas; and Acrylate OCA is difficult to be processed because of an air bubble issue.

Furthermore, automotive touch screen displays are a new market, which requires high reliability in displays. The silicone strong Si—O bond is much more stable than the C—C bond in acrylates. Especially, UV stabilized plastic cover lenses are being applied in some automotive displays, which blocks UV light, and thus makes it impossible to use acrylate OCR for laminating such displays.

SUMMARY OF THE INVENTION

The present disclosure provides a lamination method for substrates, comprising the steps of:
(a) applying a liquid silicone optical bonding agent to a first substrate,
(b) activating the liquid silicone optical bonding agent in step (a) by irradiation in a wavelength range of 200 nm to 500 nm, wherein the duration of irradiation is less than the gel time of the liquid silicone optical bonding agent, and
(c) applying a second substrate to the activated liquid silicone optical bonding agent before the liquid silicone optical bonding agent is gelled.

The present disclosure also provides a composite structure of substrates prepared by the above lamination method.

DETAILED DESCRIPTION OF THE PREFERRED EMBODIMENTS

Figure 1:
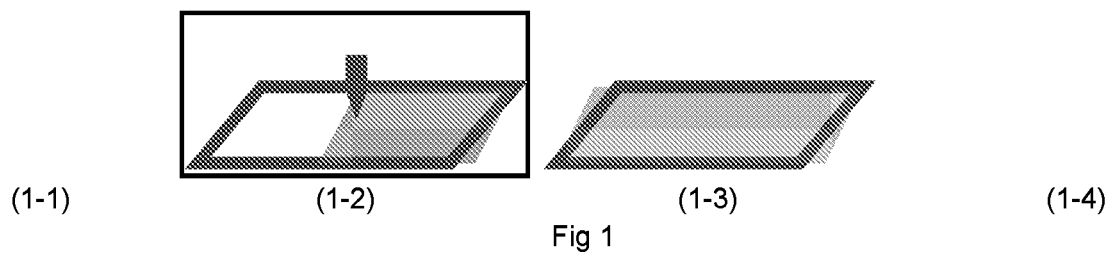
FIG. 1 schematically shows a lamination method of an example of the present disclosure as described in Example 1.

The composite structure of substrates of the present invention can be used to manufacture display devices, such as liquid crystal displays (LCDs) or organic light emitting displays (OLEDs), electronic paper (e-paper) displays, surface-conduction electron-emitter displays (SED), light emitting diode (LED) displays, electroluminescent displays (ELDs), etc. Especially, the composite structure of substrates of the present disclosure can be used to manufacture the above display devices with interactive functions.

In the present invention, the word "a" or "an" is employed to describe element(s) or component(s), and it is done to give a general sense rather than to limit the number of the element(s) or component(s) and may mean not only singular but also plural elements and components.

In present disclosure, when the word "comprise/comprising", "include/including" or "have/has/having" is employed, these are non-exclusive and mean that further component(s) or element(s) can be included besides those listed.

The present invention provides a lamination method of substrates, comprising the steps of:
(a) applying a liquid silicone optical bonding agent to a first substrate,
(b) activating the liquid silicone optical bonding agent in step (a) by irradiation in a wavelength range of 200 nm to 500 nm, wherein the duration of irradiation is less than the gel time of the liquid silicone optical bonding agent,
(c) applying a second substrate to the activated liquid silicone optical bonding agent before the liquid silicone optical bonding agent is gelled.

The gel time is measured according to ATSM D4473.

In one embodiment of the method of the present invention, the first substrate and the second substrate are substrates in an electrical display assembly.

In another embodiment of the method of the present invention, after step (c) the laminated structure is fixed and immovable.

In another embodiment of the method of the present invention, there is only 1 irradiation between step (a) and the laminated structure is fixed and immovable.

In some embodiments of the method of the present invention, the cure degree of the activated silicone liquid optical bonding agent after step (b) is equal to or below 50%, preferably equal to or below 30%, wherein the cure degree at time x is calculated by: Storage Modulus in Shear mode at time x/Storage Modulus in Shear mode after fully cured, and the Storage Modulus is measured according to ASTM E143-13.

In some embodiments of the method of the present invention, after the irradiation in step (b), the liquid silicone optical bonding agent has an open time of 30 seconds to 1000 seconds, preferably 60 seconds to 120 seconds, in liquid or semi-liquid state, for the following lamination step.

In some embodiments of the method of the present invention, the irradiation curable liquid silicone optical bonding agent is a one-component silicone material free of acrylic units, comprising a polysiloxane containing at least two alkenyl groups, a polyhydrosiloxane having on average at least two SiH groups per molecule, a silicone resin, an oxide filler with BET area between 80-400 m²/g, and a photoactive platinum catalyst.

In some embodiments of the method of the present invention, the one-component silicone material means the irradiation curable liquid silicone optical bonding agent can be stored as a one package product for a period of time and still be capable for use in the lamination application.

In some embodiments of the method of the present invention, the viscosity of the irradiation curable one component liquid silicone optical bonding agent is less than 100,000 mPa·s, and preferably less than 50,000 mPa·s according to ISO 3219.

In some embodiments of the method of the present invention, the viscosity of the irradiation curable one-component silicone optical bonding agent increases less than 100% after being stored in a UV shielding situation at a temperature lower than 23° C., for 24 hours at least. Here, the viscosity is tested according to ISO 3219.

In some embodiments of the method of the present invention, the viscosity of the irradiation curable one component silicone optical bonding agent increases less than 100% after being stored in a UV shielding situation at a temperature lower than 0° C. for 7 days, preferably at −20° C. for 3 months. Here, the viscosity is also tested according to ISO 3219.

In some embodiments of the method of the present invention, the energy of the UV irradiation in step (b) is 200 mJ/cm² to 5000 mJ/cm²; preferably 500 mJ/cm² to 3000 mJ/cm².

In some embodiments of the method of the present invention, the liquid silicone optical bonding agent is applied with a thickness of 50 μm to 2000 μm, preferably 100 μm to 1500μ m, by stencil printing, slit die coating or pattern dispensing processes.

In some embodiments of the method of the present invention, in step (b) the wavelength range of the UV irradiation is 200 nm to 500 nm; preferably 280 nm to 365 nm, more preferably 320 nm to 360 nm. The irradiation source can be selected from a metal halide UV lamp, a high irradiance UV LED lamp, an UV high-pressure mercury lamp, or an UV xenon lamp, for example.

In some embodiments of the method of the present invention, the surface of the first substrate which contacts the liquid silicone optical bonding agent is free of cellulose triacetate.

In some embodiments of the method of the present invention, the surface of the first substrate which contacts the liquid silicone optical bonding agent is formed of a polymer plastic or an inorganic glass, examples of which can be selected from a group consisting of PI, PET, PC, PMMA and ITO glass.

In some examples of the method of the present disclosure, the second substrate is an LCD or an LED or an OLED with a polarizer.

The present invention also provides an alternative lamination method of substrates, comprising steps of:
(a) applying a liquid silicone optical bonding agent to a first substrate,
(b) applying a second substrate to the liquid silicone optical bonding agent,
(c) activating the liquid silicone optical bonding agent by an irradiation with wavelength range of 200 nm to 500 nm.

A composite structure of substrates can be prepared by the method of the present disclosure. In some examples of the composite structure of substrates of the present disclosure, the cured silicone optical bonding agent layer has an UV-Visible light transparency of equal to or greater than 99% (reference of glass) according to ASTM D1003-97, a haze of equal to or lower than 0.04 according to ASTM D1003-97, a yellowness index of equal to or lower than 0.14 according to ASTM D313-73, and a volume shrinkage of equal to or lower than 0.1% according to ISO 3521:1997, wherein the volume shrinkage is calculated by $(1-d_{uncured}/d_{cured}) \times 00\%$.

Figure 4:
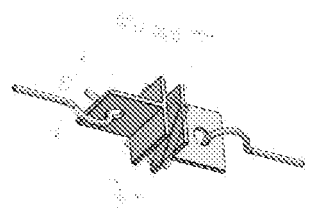
FIG. 4 illustrates a test method for assessing adhesion pull strength for laminates prepared according to the invention.

In some embodiments of the composite structures of substrates of the present invention, the adhesion pull strength between the combined substrates is 10 N/cm² to 1000 N/cm², preferably 40 N/cm² to 500 N/cm², which is tested according to the following method as shown in FIG. 4:

Sample size: 7 cm²,
Substrates: soda lime glass,
Bond-line thickness: 0.3 mm,
Peel rate: 100 mm/min,
Report maximum force and maximum expansion,
Measurement conditions: room temperature.

The composite structure of substrates of the present disclosure can be used in an interactive display system. Preferably, the interactive display system is a touch panel display.

In some examples of the present disclosure, the method also includes a post curing process, which is carried under room temperature for about 24 hours at most, or at a temperature higher than room temperature from a few minutes to dozens of minutes, depending on the applied temperature.

EXAMPLES

Example 1

A 19.5-inch all-in-one PC display was laminated with a Wacker silicone optical bonding agent UV A/B Product 1 (which is commercially available in LUMISIL® 2XX series), which contains component (A) having a viscosity of 65,000 mPas (ISO3219) and component (B) having a viscosity of 1000 mPas (ISO3219). Acrylate OCR does not work because of the yellowing formed due to material shrinkage after curing.

The lamination process is described below by referring to the accompanied FIG. 1.

Step-1: Mixing the two components (A) and (B) of Wacker silicone optical bonding agent UV A/B Product 1 and obtaining a Mixed Product 1 (see (1-1) in FIG. 1). This was done with a two-component pneumatic applicator for experiment or trial production. A two-component automatic dispensing system is recommended for mass production. The mixing and degassing were conducted simultaneously. The ratio of component (A):component (B)=10:1. The Mixed Product 1 is a one-component irradiation curable liquid silicone optical bonding agent. The viscosity of the Mixed Product 1 was 45,000 mPas according to ISO3219. The viscosity of the Mixed Product 1 increased less than 100% after being stored in one package in a UV shielding situation at a temperature lower than 23° C. for 24 hours.

Step-2: Applying the Mixed Product 1 to the touch screen panel surface of the PC display with a thickness of 250 μm by stencil printing process (see (1-2) in FIG. 1).

Step-3: The Mixed Product 1 was activated by a metal halide UV area light source with a main light wavelength range of 320-360 nm. The flash time was 8 seconds. In this case, the UV energy was 500 mJ/cm². After UV flash in Step-3, the activated Mixed Product 1 had an open time of 90 seconds in the liquid state for lamination. At this point, the cure degree of the activated Mixed Product 1 was below 50% (see (1-3) in FIG. 1).

Step-4: An LCD was laminated to the activated Mixed Product 1 in a vacuum chamber, wherein the Mixed Product 1 was in a liquid state which was far from being fully or substantially cured. The lamination step took about 60 seconds, after which the laminated structure was fixed and immovable (see (1-4) in FIG. 1).

Step-5: De-bubbling the laminated structure in an autoclave oven under 30° C. and 0.5 MPa pressure for 30 minutes.

For laminating a 19.5 inch display, it took about 2 minutes from step-2 to step-4. Step-5 was a separate process which is easily managed in production and is also a standard step for OCA/OCR lamination using Acrylic materials. No side cure was needed. An aging test was carried out at 60° C. and 90% humidity for 240 hours, and the results were positive.

| | Product data (Before cure) | |
|---|---|---|
| Viscosity of component (A) | ISO 3219 | 65,000 ± 10,000 mPa·s |
| Viscosity of component (B) | ISO 3219 | 1,000 ± 100 mPa·s |
| Viscosity of the Mixed Product 1 | ISO 3219 | 45,000 ± 10,000 mPa·s |
| | Product data (cured) | |
| Density at 23° C. | | 0.97 g/cm$^3$ |
| Volume shrinkage | $(1 - d_{uncured}/d_{cured}) * 100$ | <0.1% |
| Dielectric constant (100 Hz) | | 2.7-2.8 |
| Pull strength (Glass/Glass, Test speed: 100 mm/min) N/cm$^2$ | | 120 |
| Transmittance | UV-VIS | >99.0%, ref. Glass |
| Haze | ASTM D1003-97 | 0.04 |
| Yellowness index | ASTM D313-73 | 0.14 |
| Refractive index at 23° C. | ABBE | 1.405 |

Example 2

A 8.9-inch aviation touch screen panel was laminated with a Wacker one-component liquid silicone optical bonding agent UV Product 2 (which was commercially available in LUMISIL® 2XX series), the viscosity of which increases less than 100% after being stored in UV shielding situation under −20° C. for 3 months. The viscosity of Product 2 is 3,500 mPa·s under ISO3219. The cover plate is formed from polycarbonate plastic and the touch sensor is formed from ITO glass. Acrylate OCR does not work because of its poor adhesion to polycarbonate substrates.

Figure 2:
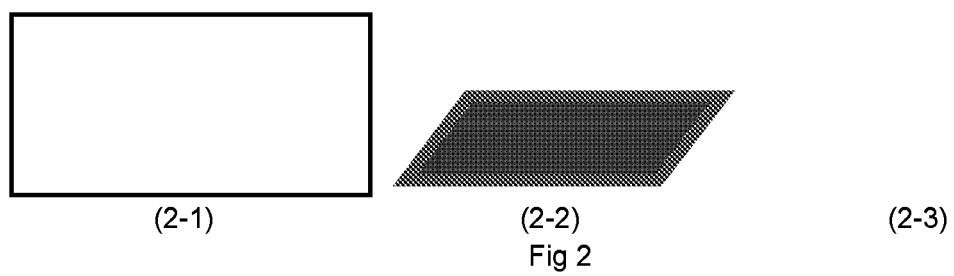
FIG. 2 schematically shows a lamination method of an example of the present disclosure as described in Example 2.
Figure 3:
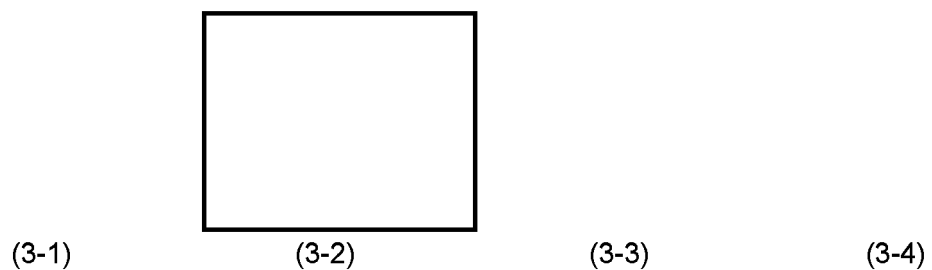
FIG. 3 schematically shows an example of the Pull test.

The lamination process is described below by referring to the accompanied FIG. 2.

Step-1: Applying Product 2 to the cover plate surface with a thickness of 300 μm by pattern dispensing (see (2-1) in FIG. 2).

Step-2: Applying the ITO glass touch sensor on the liquid Product 2 and carrying out a vacuum lamination. After lamination, the laminated layers were still movable (see (2-2) in FIG. 2).

Step-3: The product 2 was activated by a conveyor type metal halide UV line light source (see (2-3) in FIG. 2). The ITO glass was on the top side. The flash time was 90 seconds. In this case the UV energy was 3000 mJ/cm$^2$. After UV flash in Step-3, the laminated layers were fixed and immovable.

Step-4: De-bubbling the laminated layers in an autoclave oven under 30° C. and 0.5 MPa pressure for 30 minutes.

For laminating an 8.9-inch display, it took about 2 minutes from step-1 to step-3. An aging test was carried out at 60° C. and 90% humidity for 240 hours, and the result was positive.

| Product data (before cure) | | |
|---|---|---|
| Viscosity (one-component Product 2) | ISO 3219 | 3,500 ± 500 mPa · s |

| Product data (cured) | | |
|---|---|---|
| Density at 23° C. | | 0.97 g/cm³ |
| Volume shrinkage | $(1 - d_{uncured}/d_{cured}) * 100$ | <0.1% |
| Dielectric constant (100 Hz) | | 2.7-2.8 |
| Pull strength (Glass/Glass, Test speed: 100 mm/min) N/cm² | | 40 |
| Transmittance | UV-VIS | >99.0%, ref. Glass |
| Haze | ASTM D1003-97 | 0.03 |
| Yellowness index | ASTM D313-73 | 0.14 |
| Refractive index at 23° C. | ABBE | 1.405 |

Example 3

A 7-inch automotive navigator display was laminated with a Wacker silicone optical bonding agent UV A/B Product 1 (which was commercially available in LUMISIL® 2XX series), which contains component (A) having a viscosity of 65,000 mPas (ISO3219) and component (B) having a viscosity of 1000 mPas (ISO3219). The back light module was integrated into the LCD of the navigator, which was connected by a 0.5 mm thick metal bezel. The optical bonding layer is required to be 1000 μm thick. Acrylate OCR does not work because it can not meet the high reliability requirement and it is difficult to debubble an acrylate bonding layer with a thickness lower than 1.0 mm.

Step-1: Mixing the two components (A) and (B) of Wacker silicone optical bonding agent UV A/B product 1 and obtaining a Mixed Product 1. The ratio of component (A):component (B)=10:1. The Mixed Product 1 is a one-component irradiation curable liquid silicone optical bonding agent. The viscosity of the Mixed Product 1 was 45,000 mPa s according to ISO3219. The viscosity of the Mixed Product 1 increased less than 100% after being stored in one package in a UV shielding situation at a temperature lower than 23° C. for 24 hours.

Step-2: Appling the Mixed Product 1 to the ITO glass type touch screen panel of the automotive navigator display with a thickness of 1000 μm by a slit die coating process.

Step-3: The Mixed Product 1 was activated by a conveyor type metal halide UV light source. The flash time was 45 seconds. In this case the UV energy was 750 mJ/cm². After UV flash in Step-3, the activated Mixed Product 1 had an open time of 60 seconds in a liquid state for lamination. At this point, the cure degree of the activated Mixed Product 1 was below 50%.

Step-4: An LCD (with back light module) with polarizer surface was laminated to the activated Mixed Product 1 in a vacuum chamber, wherein the Mixed Product 1 was in a liquid state, which was far from being fully or substantially cured. After lamination the laminated structure is fixed and immovable.

Step-5: De-bubbling the laminated structure in an autoclave oven under 30° C. and 0.5 MPa pressure for 30 minutes For laminating a 7 inch automotive navigator, it took about 3 minutes from step-2 to step-4. Time would be shorter if an area light source was applied. No side cure was needed. An aging test was carried out at 85° C. and 85% humidity for 1000 hours, and the result was positive.

Example 4

A 5.5-inch smartphone display was laminated with a Wacker silicone optical bonding agent UV A/B Product 3 (which was commercially available in LUMISIL® 2XX series), which contains component (A) having a viscosity of 6500 mPas (ISO3219) and component (B) having a viscosity of 1000 mPas (ISO3219). The touch screen panel of the smartphone contains a frame wall, which is impossible for side cure after lamination.

Step-1: Mixing the two components (A) and (B) of Wacker silicone optical bonding agent UV A/B product 3 and obtaining a Mixed Product 3. The Mixed Product 3 is a one-component irradiation curable liquid silicone optical bonding agent. The viscosity of the Mixed Product 3 was 5,500 mPa·s according to ISO3219. The viscosity of the Mixed Product 3 increased less than 100% after being stored in one package in a UV shielding situation at a temperature lower than 0° C. for 7 days.

Step-2: Applying the Mixed Product 3 to the ITO glass touch screen panel of the smartphone display with a thickness of 150 μm by a slit die coating process.

Step-3: The Mixed Product 3 was activated by a conveyor type metal halide UV line light source. The flash time was 90 seconds. In this case the UV energy was 1200 mJ/cm². After UV flash in Step-3, the activated Mixed Product 3 had an open time of 90 seconds in liquid state for lamination. At this point, the cure degree of the activated Mixed Product 3 was below 50%.

Step-4: An LCD was laminated to the activated Mixed Product 3 in a vacuum chamber, wherein the Mixed Product 3 was in a liquid state, which was far away from fully or substantially cured. After lamination the laminated structure was fixed and immovable. The laminated structure was also bubble free.

For laminating a 5.5 inch smartphone, it took about 3 minutes from step-2 to step-4. Time would be shorter if an area light source was applied. No side cure was needed. An aging test was carried out at 60° C. and 90% humidity for 240 hours, and the result was positive.

| Product data (Before cure) | | |
|---|---|---|
| Viscosity of component (A) | ISO 3219 | 6,500 ± 500 mPa · s |
| Viscosity of component (B) | ISO 3219 | 1,000 ± 100 mPa · s |
| Viscosity of Mixed Product 3 | ISO 3219 | 5,500 ± 500 mPa · s |

-continued

| Product data (cured) | | |
|---|---|---|
| Density at 23° C. | | 0.97 g/cm$^3$ |
| Volume shrinkage | $(1 - d_{uncured}/d_{cured}) * 100$ | <0.1% |
| Dielectric constant (100 Hz) | | 2.7-2.8 |
| Pull strength (Glass/Glass, Test speed: 100 mm/min) N/cm$^2$ | | 45 |
| Transmittance | UV-VIS | >99.0%, ref. Glass |
| Haze | ASTM D1003-97 | 0.04 |
| Yellowness index | ASTM D313-73 | 0.11 |
| Refractive index at 23° C. | ABBE | 1.405 |

Example 5

A 13.3-inch notebook PC display was laminated with a Wacker silicone optical bonding agent UV A/B Product 1 (which was commercially available in LUMISIL® 2XX series), which contains component (A) having a viscosity of 65,000 mPas (ISO3219) and component (B) having a viscosity of 1000 mPas (ISO3219). The touch screen panel of the notebook PC contains a UV stabilized plastic substrate, manufactured from an IML (in-mold labelling) process, through which UV light cannot penetrate. Acrylate OCR does not work because after lamination, it cannot receive the necessary UV radiation for fully curing.

Step-1: Mixing the two components (A) and (B) of Wacker silicone optical bonding agent UV A/B product 1 and obtaining a Mixed Product 1. The Mixed Product 1 is a one-component irradiation curable liquid silicone optical bonding agent. The viscosity of the Mixed Product 1 was 45,000 mPa·s according to ISO3219. The viscosity of the Mixed Product 1 increased less than 100% after being stored in one package in a UV shielding situation at a temperature lower than 23° C. for 24 hours.

Step-2: Applying the Mixed Product 1 to the touch screen panel of the notebook PC display with a thickness of 250 μm by a stencil printing process.

Step-3: The Mixed Product 1 was activated by a 365 nm UV LED light source. The flash time was 5 seconds. In this case the UV energy was 3000 mJ/cm$^2$. After UV flash in Step-3, the activated Mixed Product 1 had an open time of 120 seconds in the liquid state for lamination. At this point, the cure degree of the activated Mixed Product 1 was below 30%.

Step-4: An LCD was laminated to the activated Mixed Product 1 in a vacuum chamber, where the Mixed Product 1 was far from being fully or substantially cured. After lamination the laminated structure was fixed and immovable.

Step-5: De-bubbling the laminated structure in an autoclave oven under 30° C. and 0.5 MPa pressure for 30 minutes.

For laminating a 13.3 inch notebook PC display, it took about 2 minutes from step-2 to step-4. An aging test was carried out at 60° C. and 90% humidity for 240 hours, and the result was positive.

The invention claimed is:

1. A method for laminating substrates, comprising the steps of:
   a) applying a liquid silicone optical bonding agent to a first substrate,
   b) activating the liquid silicone optical bonding agent applied in step (a) by irradiation with light of a wavelength in the range of 200 nm to 500 nm, wherein the duration of the irradiation is less than the gel time of the liquid silicone optical bonding agent,
   c) applying a second substrate to the activated liquid silicone optical bonding agent before the liquid silicone optical bonding agent is fully gelled, wherein
   the liquid silicone optical bonding agent is an irradiation curable one-component silicone material free of acrylic units, comprising the ingredients i) a polysiloxane containing at least two alkenyl groups, ii) a polyhydrosiloxane having on average at least two SiH groups per molecule, iii) a silicone resin different from ingredients i) and ii), iv) an oxide filler with BET surface area between 80-400 m$^2$/g, and v) a photoactive platinum catalyst.

2. The method of claim 1, wherein the first substrate and the second substrate are substrates in an electrical display assembly, and after step (c) the laminated structure is fixed and immovable.

3. The method of claim 1, wherein there is only 1 irradiation between step (a) and step (c), and the laminated structure is thereafter fixed and immovable.

4. The method of claim 1, wherein the degree of cure of the activated liquid silicone optical bonding agent after step (b) is equal to or below 50%, wherein the cure degree at time x is calculated by:
   Storage Modulus in Shear mode at time x/Storage Modulus in Shear mode after fully cured, and the Storage Modulus in Shear mode is measured according to ASTM E143-13.

5. The method of claim 1, wherein the degree of cure of the activated liquid silicone optical bonding agent after step (b) is equal to or below 30%, wherein the cure degree at time x is calculated by:
   Storage Modulus in Shear mode at time x/Storage Modulus in Shear mode after fully cured, and the Storage Modulus in Shear mode is measured according to ASTM E143-13.

6. The method of claim 4, wherein the viscosity of the irradiation curable one-component silicone optical bonding agent increases less than 100% after being stored in an UV-shielding manner at a temperature lower than 23° C. for 24 hours.

7. The method of claim 4, wherein the viscosity of the irradiation curable one-component silicone optical bonding agent increases less than 100% after being stored in an UV-shielding manner at a temperature lower than 0° C. for 7 days.

8. The method of claim 4, wherein the viscosity of the irradiation curable one-component silicone optical bonding agent increases less than 100% after being stored in an UV-shielding manner at a temperature lower than −20° C. for 3 months.

9. The method of claim 1, wherein after the UV irradiation in step (b), the activated liquid silicone optical bonding agent has an open time of 30 seconds to 1000 seconds in a liquid or semi-liquid state for a following lamination step.

10. The method of claim 1, wherein after the UV irradiation in step (b), the activated liquid silicone optical bonding agent has an open time of 60 seconds to 120 seconds in a liquid or semi-liquid state for a following lamination step.

11. The method of claim 1, wherein the surface of the first substrate, which contacts the liquid silicone optical bonding agent is free of cellulose triacetate.

12. The method of claim 1, wherein silicone optical bonding agent, when fully cured has an UV-Visible light transparency of equal to or greater than 99% with reference to glass according to ASTM D1003-97, a haze of equal to or lower than 0.04 according to ASTM D1003-97, a yellowness index of equal to or lower than 0.14 according to ASTM D313-73, and a volume shrinkage of equal to or lower than 0.1% according to ISO 3521:1997, wherein the volume shrinkage is calculated by $(1-d_{uncured}/d_{cured}) \times 100\%$.

13. The method of claim 12, wherein the adhesion pull strength between the combined substrates is 10 N/cm² to 1000 N/cm².

14. The method of claim 12, wherein the adhesion pull strength between the combined substrates is 40 N/cm² to 500 N/cm².

* * * * *